United States Patent [19]

Anderson

[11] Patent Number: 5,154,824
[45] Date of Patent: Oct. 13, 1992

[54] GRANULAR MEDIA FILTRATION SYSTEM WITH IMPROVED BACKWASHING

[75] Inventor: Arthur S. Anderson, Cypress, Calif.
[73] Assignee: Gierlich-Mitchell, Inc., El Segundo, Calif.
[21] Appl. No.: 745,685
[22] Filed: Aug. 16, 1991
[51] Int. Cl.⁵ ............................................. B01D 24/46
[52] U.S. Cl. ................... 210/274; 210/275; 210/794; 210/795
[58] Field of Search ............ 210/275, 274, 793, 794, 210/795, 792, 279, 305, 807

[56] References Cited

U.S. PATENT DOCUMENTS

| | | | |
|---|---|---|---|
| 798,473 | 8/1905 | Wilson | 210/275 |
| 1,069,737 | 8/1913 | Stevenson | 210/794 |
| 2,679,319 | 5/1954 | Walker | 210/275 |
| 3,286,842 | 11/1966 | De Jong | 210/275 |
| 3,313,420 | 4/1967 | Hirsch | 210/275 |
| 4,322,299 | 3/1982 | Scholten et al. | 210/794 |
| 4,338,202 | 7/1982 | Louboutin | 210/795 |
| 4,478,726 | 10/1984 | Moore | 210/275 |
| 4,479,880 | 10/1984 | Treanor | 210/275 |

Primary Examiner—Stanley S. Silverman
Assistant Examiner—Cynthia L. Nessler
Attorney, Agent, or Firm—Plante, Strauss and Vanderburgh

[57] ABSTRACT

There is disclosed a granular filtration system having a separator trough with an air deflection baffle of improved shape and operation, preferably combined with an airlift mechanism for cleaning or removing settled granular media particles from the upper surface of the air deflection baffle. The air deflection baffle is used in a regeneration method for the granular media filtration system in which the granular media is purged of filtered solids by backflushing with air and water. In this application, the air-deflection baffle is installed beneath and adjacent to the open throat of a solids separation vessel, typically which is in the form of a trough spanning the width of the filtration vessel and having an inclined bottom wall with an open throat. The improved configuration of the air deflection baffle is generally an inverted W-shape. A plurality of open-ended tubes are secured on the air deflection baffle, transversely to the longitudinal axis thereof. When the tubes are on the upper surface of the baffle, a plurality of orifices are provided through the center inverted apex of the air deflection baffle which communicate with the aforementioned tubes. When the tubes are on the undersurface of the baffle, openings through the baffle and into the tubes are provided. The granular media solids which settle in the separation trough and gravitate onto the upper surface of the air deflection baffle are removed by an airlift action, being swept into the airlift tubes and discharged therefrom by an airlift action as a result of the air introduced into the airlift tubes.

14 Claims, 3 Drawing Sheets

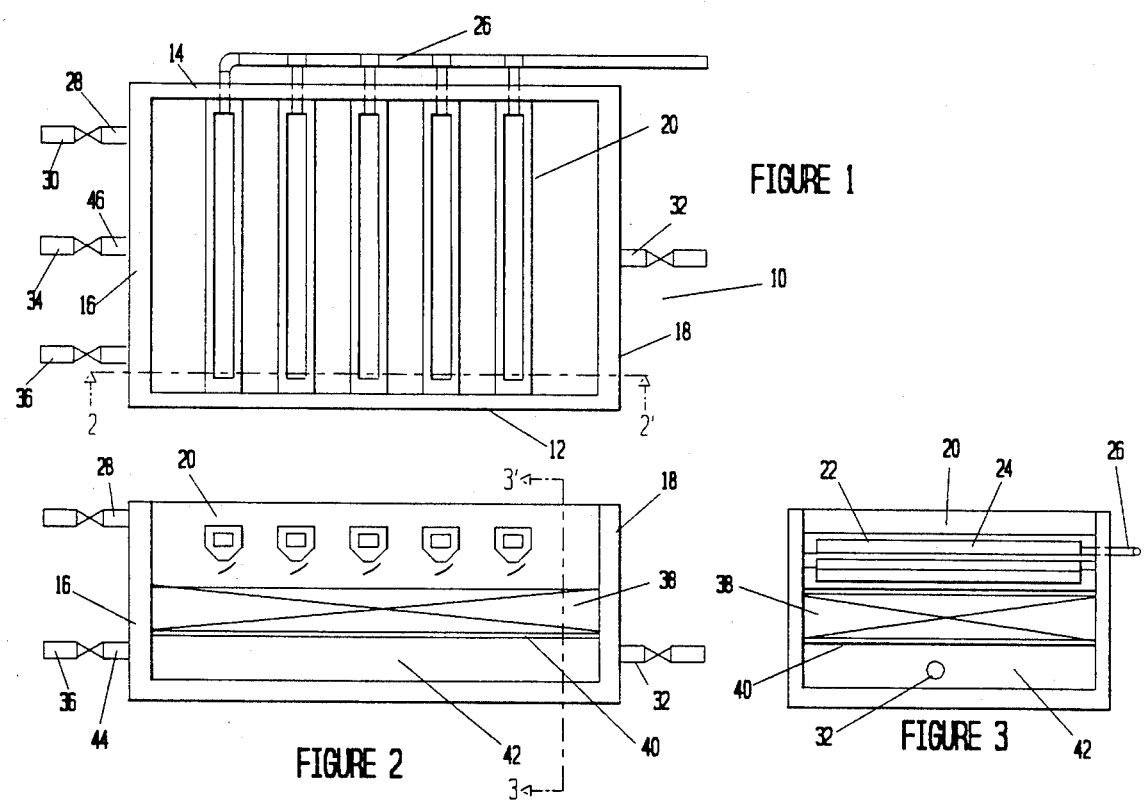

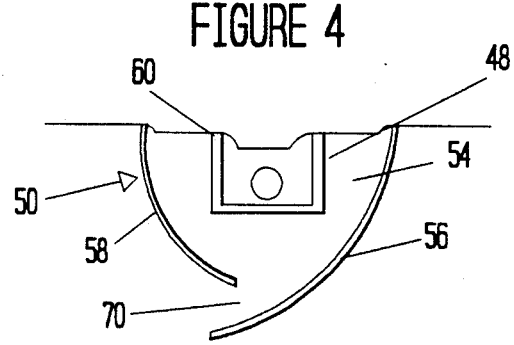
FIGURE 4
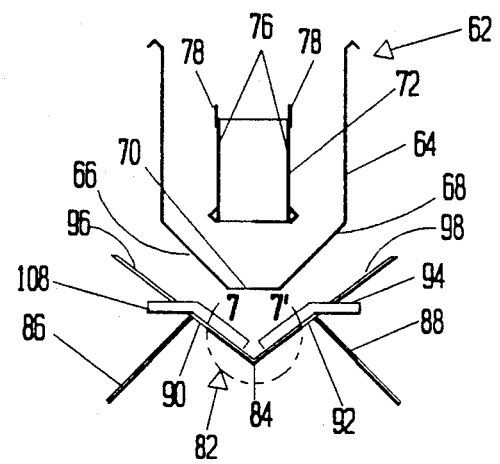
FIGURE 5
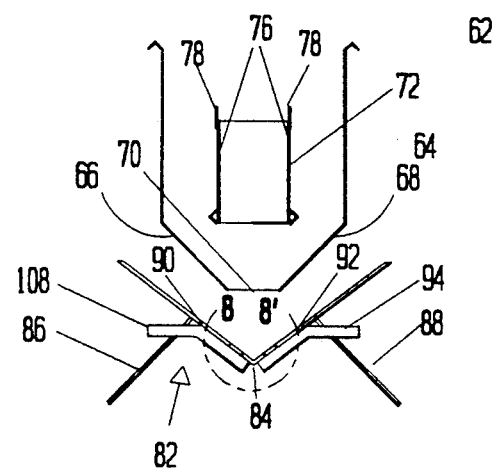
FIGURE 6
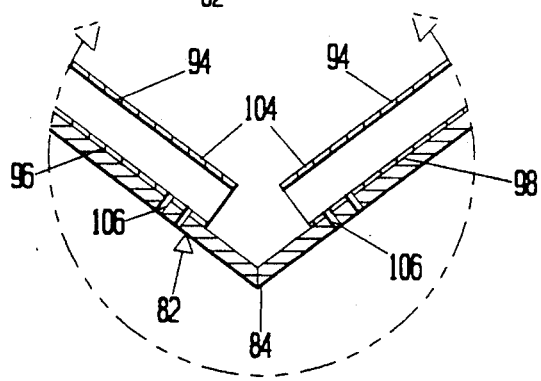
FIGURE 7
FIGURE 8

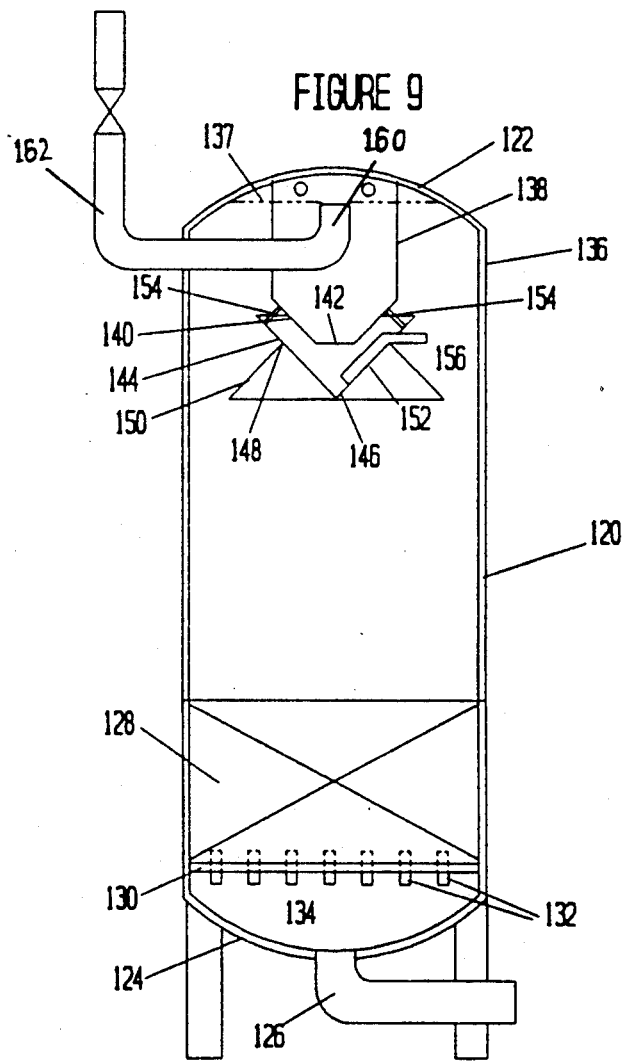

GRANULAR MEDIA FILTRATION SYSTEM WITH IMPROVED BACKWASHING

BACKGROUND OF THE INVENTION

1. Field of Invention

This invention relates to a granular media filtration system, and in particular, to one having an improved method and apparatus for backwashing.

2. Brief Statement of the Prior Art

Granular media filtration systems are used in a large number of applications for the filtration of suspended impurities from water such as waste, industrial water, sewage plant affluent, etc. The filtration systems customarily include a containment vessel in which reposes a bed of granular filtration media, usually granules of anthracite or silica. A liquid containing suspended solids is introduced into the bed, usually in a downflow configuration and the filtered liquid is removed from the opposite side of the bed. When the filtration media becomes clogged with separated solids, the solid bed is regenerated by flushing with water and/or air, usually with a backflow treatment, wherein water and air are introduced beneath the granular media bed and flow upwardly therethrough. The introduction of air and water causes agitation of the granular medium particles releasing trapped previously separated solids. Solids are removed by keeping them in suspension from liquid and air agitation and subsequent removal by dilution into the backwash water. Flotation of the solids can also be another removal mechanism.

The separation is carried out in some installations with a number of trough separators which are placed across the vessel near its upper extremity. The liquid enters the trough and a quiescent zone is maintained within the trough by placing an air deflection baffle beneath an open throat in the bottom of the trough. A collection channel is placed within the separator trough and the liquid within the trough which is clarified of the granular media by its settling in the quiescent zone of the collection channel spills over the upper edges of the trough, carrying with it the low density and fine, separated solids which are then withdrawn from the vessel.

Some difficulties are experienced with the aforedescribed apparatus. There are two major difficulties. The first is that the separated granular media particles which settle in the separator trough tend to accumulate on the upper surface of the air deflection baffle, clogging the separator trough which fills with granular media particles until the separation system is no longer effective. The other major difficulty is the complete exclusion of air from the separator trough. Even small amounts of air will transport significant amounts of media from the filter into the backwash channel.

Accordingly, there exists a need for an effective separation system which does not become clogged with settled granular media particles so that the system can be operated during backflushing over sufficient lengths of time to regenerate the granular media bed for reuse in the filtration system.

OBJECTS OF THE INVENTION

It is an object of this invention to provide a granular solids filtration apparatus and method of improved efficiency and operation.

It is a further object of this invention to provide a granular media filtration apparatus and method having a regeneration method of improved efficiency.

It is also an object of this invention to provide a granular media filtration method and apparatus in which separated granular media particles do not clog the equipment or interrupt the backwashing regeneration treatment.

It is a specific objective of this invention to provide a deflection baffle of improved configuration and operation for use during backflushing of a granular media filtration system.

It is a further specific objective of this invention to provide airlift pumping capacity to dislodge accumulated settled granular media particles from the upper surface of an air-deflecting baffle in the aforementioned equipment.

Other and related objects will be apparent from the following description of the invention.

BRIEF DESCRIPTION OF THE INVENTION

This invention comprises a granular filtration system having a separator trough with an air deflection baffle of improved shape and operation, preferably combined with an airlift mechanism for cleaning or removing settled granular media particles from the upper surface of the air deflection baffle. The air deflection baffle is used in a regeneration method for the granular media filtration system in which the granular media is purged of filtered solids by backflushing with air and water simultaneously. In this application, the air-deflection baffle is installed beneath and adjacent to the open throat of a solids separation vessel, typically which is in the form of a trough spanning the width of the filtration vessel and having an inclined bottom wall with an open throat. The improved configuration of the air deflection baffle is generally an inverted W-shape. A plurality of open-ended tubes are secured on the air deflection baffle, transversely to the longitudinal axis thereof. When the tubes are on the upper surface of the baffle, a plurality of orifices are provided through the center inverted apex of the air deflection baffle which communicate with the aforementioned tubes. When the tubes are on the undersurface of the baffle, openings through the baffle and into the tubes are provided. The granular media solids which settle in the separation trough and gravitate onto the upper surface of the air deflection baffle are removed by an airlift action, being swept into the airlift tubes and discharged therefrom by an airlift action as a result of the air introduced into the airlift tubes.

BRIEF DESCRIPTION OF THE DRAWINGS

The invention will be described with reference to the drawings of which:

FIG. 1 is a plan view of a typical granular media filtration vessel;

FIG. 2 is a sectional view along line 2—2' of FIG. 1;

FIG. 3 is a sectional view along line 3—3' of FIG. 2;

FIG. 4 is a sectional view through a typical prior art solids separator and collection system;

FIG. 5 is a sectional view through the solids separation and collection vessels of this invention;

FIG. 6 is a sectional view as in FIG. 5, of an alternative embodiment of the invention;

FIG. 7 is an enlarged view of the area within line 7—7' of FIG. 5;

FIG. 8 is an enlarged view of the area within line 8—8' of FIG. 6; and

FIG. 9 is a view of an alternative settling vessel provided with the solids separation and collection vessels of this invention.

DESCRIPTION OF THE PREFERRED EMBODIMENT

Referring now to FIG. 1, there is illustrated, in plan view, a typical granular media filtration vessel 10. The vessel 10 is typically rectangular in shape with sidewalls 12 and 14 and end walls 16 and 18 and an open top. A plurality of solids separators 20 in the form of troughs 24 are disposed in parallel, side-by-side relationship at incremental spacings, spanning the width of the vessel. Within each separator 20 is disposed a solid collection vessel 22. The solid collection vessels 22 are connected through piping, not shown, to a solids and liquid removal header 26. The vessel 10 is, of course, provided with an inlet nozzle 28 connected to a line 30 which supplies the aqueous liquid suspension of solid impurities for filtration and a clarified liquid withdrawal nozzle 32. An air supply line 34, and a water supply line 36 are connected to appropriately located nozzles in the lower portion of the vessel to permit back flushing in the manner hereinafter described.

Referring now to FIG. 2, there is illustrated a longitudinal cross sectional elevational view of the vessel 10. As there illustrated, the vessel 10 contains a granular media bed 38 of particulate filtration material, typically anthracite, silica, garnet, activated carbon, etc. These particles are typically from about 0.25 to about 3 millimeters, particle diameter, and function as a filtration bed for the removal of solids which are suspended in the liquid feed to the vessel 10. Typically, the liquid is introduced into the vessel 10 above the upper level of the granular media bed 38 and flows downwardly through the bed of granular media, through a foraminous support plate or grate 40 and into a collection and withdrawal zone 42 located at the bottom of the vessel 10. The zone 42 is open to the nozzle 32 to provide for evacuation of the filtered liquid from the vessel 10.

The typical provision for cleansing the granular media bed of separated solid matter is by back flushing and, for this purpose, an inlet nozzle 44 is connected to a water supply line 36 is provided in the lower extremity of the bed 38 so that the water flows upwardly through the bed 38, opposite to the direction of the liquid undergoing filtration during the filtration cycle.

In the most advanced versions of the aforedescribed system, the cleansing action of the water during the back washing operation is enhanced by air agitation of the particles and this is achieved by providing an air inlet nozzle 46 (see FIG. 1) connected to a compressed air supply line 34. The nozzle 46 also discharges into the lower extremity of the vessel 10 for concurrent upflow of air with the water through the granular media bed 38.

FIG. 3 is a sectional view along line 3—3' and further illustrates the shape and operation of the filtration vessel 10.

Referring now to FIG. 4, there is illustrated a sectional view through a solids separation and collection system 50 exemplified by the best known prior art. In this system, the solids separation troughs 48 are open-topped and have a flat bottom wall. The troughs 48 are each surrounded by two, curved, air-deflection baffles 56 and 58, each baffle having a generally arcuate cross section, as illustrated in FIG. 4. The primary function of these baffles 56 and 58 is to deflect the flotation air and prevent entry of the flotation air into the settling zone 54 surrounding each trough 48, thereby creating a quiescent condition within the settling zone 54 and thus permitting the settling of the granular media particles. As the granular media particles settle, they pour down the inclined, arcuately sectioned air deflection baffles 56 and 58, through the narrow throat 70 between the baffles, and are again suspended in the wash water.

The liquid within the settling zone 54 spills into the separation trough 48 which has been freed of the granular media particles contains suspended impurities which were cleansed from the granular media particles, and the liquid suspension of these solid impurities spills over the upper edges of the collection trough 60 from which it is removed through the collector nozzle previously described.

As previously mentioned, a difficulty frequently encountered with the aforementioned prior art system is that solids separator troughs 48 and the throat 70 between the air deflection baffles 56 and 58 become clogged with the settled particles of the granular media. This occurs because the angle of repose of the granular media particles is quite shallow and consequently, the settled particles do not readily pour down the inclined upper surfaces of the air deflection baffles 56 and 58 and through throat 70, but instead accumulate thereon until the open throat 70 becomes clogged and the solids collector system becomes ineffective. If the angle of the baffles from the horizontal is increased, in an attempt to move the settled particles through throat 70, the baffles lose their effectiveness to deflect air flow, and more air is admitted into the settling zone 54, disrupting the operation of the settling system.

The improved solids separator and collector used in the system of my invention is shown in FIGS. 5 and 7. As there illustrated, the invention uses a solids separator 62 in the form of an elongated trough 64 having a bottom with a V-shape, formed by inclined sidewalls 66 and 68 with a central open throat 70 therebetween. The solids collector, in the form of a second open-top trough 72 is disposed in the upper region of the solids separator trough 64. The solids collector trough 72 can have a flat bottom 74 if desired, such as illustrated. As previously mentioned, this collector trough 72 is connected through appropriate piping to an evacuation header for the removal of the collected solid impurities. Preferably, the upper edges 76 of the collector trough 72 have vertically adjustable baffles 78 to provide weirs of adjustable height thereby controlling the rate of spillage of the liquid containing the suspended solid impurities.

Immediately beneath and adjacent to the open throat 70 of the solids separator trough 72 is an elongated air deflection baffle 80. The air deflection baffle 80 has a central portion 82 of an inverted V-shape with its apex 84 preferably symmetrically oriented to the open throat 70 of the separator trough 64. A pair of wing baffles 86 and 88 are preferably provided, one each coextensively secured to the opposite edges 90 and 92 of the V-shaped air deflection baffle 80, in a downwardly inclined orientation as shown, whereby the air deflection baffle 80 assumes an inverted W-shape. The upper edges of the central portion 82 preferably extend upwardly sufficiently to terminate adjacent the inclined bottom walls 66 and 68 of the solids separation trough 72.

A plurality of open-ended tubes 94 which can be circular, rectangular or square in cross section, are disposed in parallel, side-by-side relationship along the upper surfaces 96 and 98 of central portion 82 of air deflection baffle 80. These tubes 94 are oriented transversely to the longitudinal axis of the air deflection baffle 80 and are positioned on each inclined surface 96 and 98 thereof so that their lower ends 104 are located adjacent to, but spaced above the apex 84 of the baffle 80 by a slight distance, as shown. A plurality of orifices 106 are provided in the under surface of the air deflection baffle 80, at locations immediately beneath the tubes 94 and these orifices also extend through the tubes 94 to thereby provide for air passage from the liquid media beneath the air deflection baffle 80 into the tubes 94.

The air which is thus introduced into the tubes 94 generates an air lift within the tubes 94. Solids which settle in the solids separator trough 64 and gravitate through the open throat 70 onto the upper surface of the air deflection baffle 80 are thus swept into the open lower ends 104 of the tubes 94 from where the solids are lifted and discharged through the upper ends 108 of the tubes 94. The upper ends 108 can extend outwardly beyond the lateral edges of the V-shaped air deflection baffle 80. A preferred optional feature is an air line 116 which is positioned to discharge air directly beneath the air deflection baffle 80 to provide an air purge through the orifices 106 at the conclusion of the backwashing cycle, thereby effecting a final cleaning of settled solids from air deflection baffle 80.

Referring now to FIGS. 6 and 8, there is illustrated an alternative embodiment of the invention, in which the air lift tubes 94 are positioned on the undersurfaces 110 and 112 of the air deflection baffle 80. In this application, openings 114 are provided through the air deflection baffle 80, opening into the air lift tubes 94 near the lower ends 104 of the tubes. These openings permit the settled solids to enter the air lift tubes, from which they are pumped and discharged through the opposite open ends of the air lift tubes 94.

In other respects the structure is the same as that described with reference to FIG. 5, and the same drawing element numbers are used for the same elements in the two drawings.

Although the invention has been described with reference to a solids filtration vessel having a rectangular shape, it could also be used in cylindrical vessels. FIG. 9 illustrates a cylindrical vessel 120 having a conventional dome top 122 and bottom 124, with a bottom nozzle 126 to introduce air and water. The solids bed 128 is maintained on a foraminous plate 130, e.g., a plate with a plurality of open tubes 132 to permit fluid communication between the granular solids bed 128 and the subjacent collection zone 134 beneath the plate 130. At the upper end 136 of the vessel, a solids separator 138 is supported from the underside of the dome top 122. The separator 138 is cylindrical with a conical bottom 140 having a central open throat 142 which is disposed above the air deflection baffle 144. The latter has a central conical section 146 and is received in the central opening 148 of a lower conical baffle 150, which is permanently secured to the undersurface 152 of the central conical section 146. The resulting air deflection baffle 144 is suspended beneath the solids separator 138 by a plurality of braces 154 which are spaced at angular increments around the baffle 144.

At least one open-ended tube 156 is placed on the central conical section 146, above the section, as shown, or on its undersurface. When placed on the upper surface, the tube 156 is provided with a plurality of orifices, such as shown in FIG. 5, which admit air into the tube 156 to create an air lift effect, thereby pumping any solids which accumulate on the air deflection baffle central section, and discharging the solids through the opposite end 158 of the tube.

The level of the liquid within the separator 138 is shown by broken line 137. This liquid contains suspended solid impurities and discharges into the inverted open end 160 of withdrawal conduit 162 and is withdrawn through this conduit.

In all applications of the invention, the air lift tubes 94 have been found to very effectively maintain the upper surfaces of the air deflection baffle 80 clear of accumulations of settled particles of the granular filtration media and it has been found that the back flushing of the granular media bed in a system provided with the air deflection baffles of my invention proceeds very effectively without interruptions in the removal of the settled particles of the granular filtration media from the air deflection baffles. The improved system of this invention significantly reduces loss of the granular solid media as entrance of air into the quiescent settling zone is effectively precluded.

The invention has been described in an application to conventional granular media solids filtration. It is also applicable to other operations requiring separation of solids from a liquid medium, particularly those in which a gas, such as air, is introduced into a process, or where a gas such as carbon dioxide is generated during the process. An example of such applications is the aerobic oxidation of waste solids, or of an organic feed material, e.g., the yeast fermentation of carbohydrates to produce alcohol. Other examples include anaerobic decomposition of organic wastes, during which carbon dioxide is generated. In these applications, there is a requirement for an effective separation of solids from the liquid culture medium. In the past, these processes have generally been conducted batchwise, as the separation of solids from the culture medium has not been achieved previously in a medium frothed by evolved gases or continuously aerated as required by these processes. This invention is admirably suited to permit continuous processing of these operations, as the solids can be readily separated from a frothed liquid using the separator system of this invention, and there is thus no necessity to interrupt the process to permit separation of the solids, such as the residual organic mass, or the bacteria or yeast cultures.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an apparatus for the contacting of granular solids with a liquid medium which is frothed with a gas, which comprises a containment vessel having an inlet for introduction of a liquid medium containing suspended material, a support for a retained bed of solids, a filtered liquid outlet and solids separation facilities including at least one separator vessel mounted within said containment vessel in an upper region thereof and having an bottom wall having an open throat, with a gas deflection baffle located beneath said open throat, and an open-top solids collector located within said containment vessel and having a withdrawal outlet communicating exteriorly of said filtration apparatus, the improvement comprising:

(a) inwardly inclined sidewalls in the lower portion of said separator vessel with said gas deflection baffle having a V-shape with inclined sides adjacently beneath said throat and generally parallel to said inwardly inclined sidewalls of said separator vessels, and (b) at least one gas lift tube supported by said gas deflection baffle, and having a solids inlet adjacent the lower portion of said V-shaped baffle and an outlet discharging beyond the media settle zone with (c) at least one gas inlet orifice communicating with the interior of said gas lift tube to provide a source of lift gas therein.

2. The apparatus of claim 1 as applied to a fermentation process wherein said inlet for introduction of a liquid medium containing suspended material provides means for introduction of a microorganism and solids growth medium into said vessel, and wherein said support for a retained bed of solids provides means for support for the culture medium within said vessel, and said filtered liquid outlet and solids separation facilities provides means for the continuous removal of culture medium and liquid from said vessel.

3. The apparatus of claim 1 as applied to a granular filtration apparatus, wherein said improvement provides an improved efficiency in backwashing and including inlet means to introduce water and air into said filtration vessel for upflow therein.

4. The granular media filtration apparatus of claim 2 wherein said gas lift tubes rest on the upper surface of said gas deflection baffle, and said at least one orifice extends through said gas deflection baffle.

5. The granular media filtration apparatus of claim 3 wherein said gas lift tubes are supported on the under surface of said gas deflection baffle, and said solids inlet comprises an opening through said gas deflection baffle communicating with the lower end of each of said gas lift tubes.

6. The granular media filtration apparatus of claim 3 wherein said gas deflection baffle has outer baffles inclined downwardly from the undersurface thereof.

7. The granular media filtration apparatus of claim 3 wherein said separator vessel base has vertically adjustable upper edges which serve as weirs to permit a controlled rate of water and flotation solids into said separator vessel.

8. The granular media filtration apparatus of claim 3 wherein said inclined sidewalls are flat planar and inclined at an angle which exceeds the angle of repose of said particulate media.

9. The granular media filtration apparatus of claim 8 wherein said inclined sides of said gas deflection baffle are also flat planar.

10. The granular media filtration apparatus of claim 3 wherein said collection vessel is a trough mounted within a trough-shaped separator which extends across said filtration vessel.

11. The granular media filtration apparatus of claim 10 wherein a plurality of gas lift tubes are provided at equal spacings along the length of said collection trough.

12. The granular media filtration apparatus of claim 10 including an air inlet line discharging immediately beneath said gas deflection baffle and including valve means in said air inlet line to permit intermittent use of said air line to introduce an air purge at the completion of a backwashing cycle.

13. The granular media filtration apparatus of claim 10 wherein said filtration vessel contains a plurality of said trough-shaped separators and collection troughs.

14. The granular media filtration apparatus of claim 13 wherein said plurality of trough-shaped separators are located at equal side-to-side spacings across said filtration vessel.

* * * * *